March 22, 1938.  D. H. MONTGOMERY  2,111,869
SPINDLE MOUNTING
Filed March 28, 1936  2 Sheets-Sheet 1

INVENTOR
Donald H. Montgomery
BY
ATTORNEY

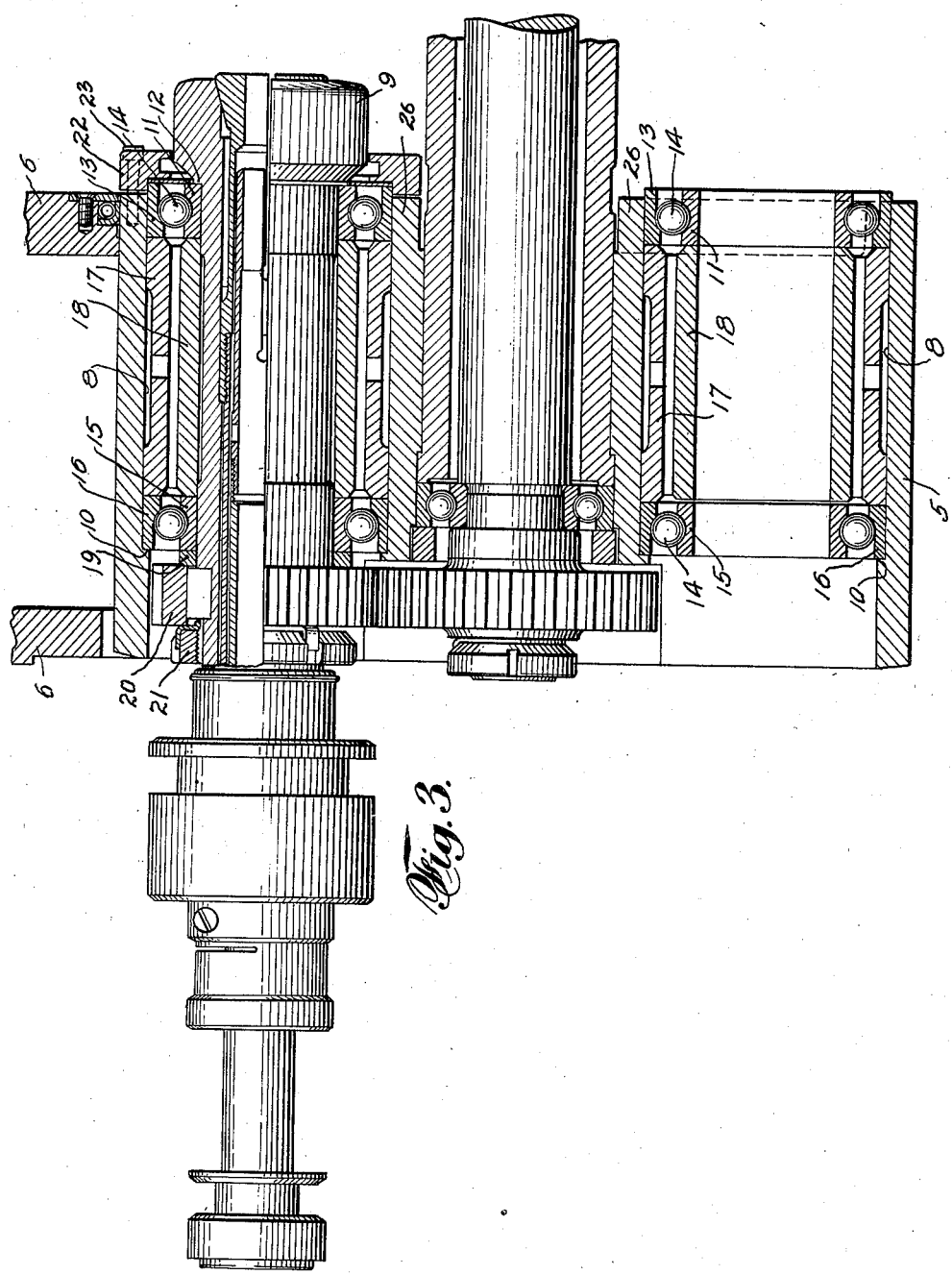

Patented Mar. 22, 1938

2,111,869

UNITED STATES PATENT OFFICE 2,111,869

SPINDLE MOUNTING

Donald H. Montgomery, Berlin, Conn., assignor, by mesne assignments, to The New Britain Machine Company, New Britain, Conn., a corporation of Connecticut Application March 28, 1936, Serial No. 71,427

5 Claims. (Cl. 29—37)

My invention relates to a spindle mounting.

The spindles of modern screw machines, for example, are run at very high speeds and such spindles are often mounted on anti-friction bearings, such as ball bearings. For very accurate work there must be substantially no clearance between the anti-friction bearing and its housing or spindle carrier and between the anti-friction bearing and the spindle. The spindle at the same time should be properly supported against any end play or movement under the thrust of end working tools. The requirements for substantially no clearance radially and no spindle movement axially has resulted in the practice of preloading spaced apart anti-friction bearings so that the bearings are caused to very firmly engage both the spindle carrier and the spindle and at the same time take end thrust of the spindle, so that while there may be free rotative movement of the spindle there is substantially no movement either axially or radially thereof during the operation of the machine. During the process of preloading bearings the outer rings or cups are expanded or stretched by the anti-friction bearing members and an exceedingly tight fit is obtained between the bore holding the outer ring or cup and the outer ring and between the spindle and the inner ring. During the expansion of the outer ring any irregularities permitting unequal expansion of the outer ring tend to expand the same to an out of round shape or to in effect put lobes therein and when the machine is in operation the operation is unsatisfactory and the bearings soon fail.

It is the principal object of my invention, therefore, to provide a spindle mounting with preloaded bearings so arranged that there may be substantially no axial or radial movement of the spindle during operation and yet the bearing may be heavily preloaded without detriment to the bearing in operation.

It is a further object to provide a spindle mounting which will permit uniform expansion of the bearing either under an expanding load or under conditions of high temperature.

Other objects and features of invention will be either hereinafter pointed out or will become apparent to those skilled in the art.

Briefly stated, in a preferred form of the invention I provide a bearing support or carrier which may be a spindle carrier for a screw machine, for example.

A spindle is rotatably mounted in the carrier on anti-friction bearings which are preloaded. In order to permit equal and uniform expansion of the outer rings or cups during the process of preloading or subsequently due to conditions of high running temperature, etc., I provide a supporting portion or sleeve for the anti-friction bearing or bearings of substantially uniform section so that the outer ring or cup, in expanding, may expand equally, due to the fact that the supporting sleeve, being of uniform thickness, will expand uniformly and the bearing will be maintained in its proper, truly round condition. An anti-friction bearing, even under heavy load conditions, is remarkably long lived and free from wear if the rings are perfectly round and concentric.

In the drawings which show, for illustrative purposes only, a preferred form of the invention—

Fig. 3 is a sectional view taken substantially in the plane of the line 3—3 of Fig. 1.

Figure 2:
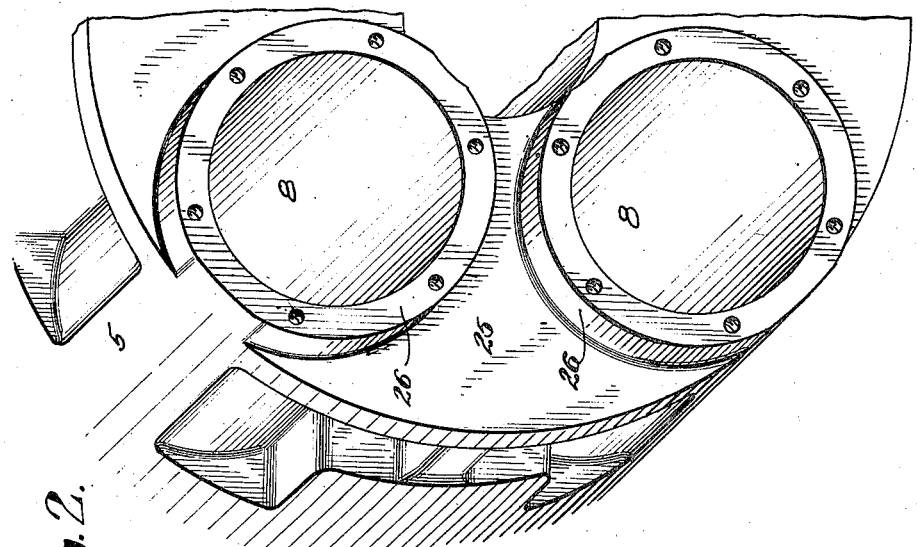
Fig. 2 is an isometric view of a part of the spindle carrier shown in Fig. 1 and illustrating features of the invention.
Figure 1:
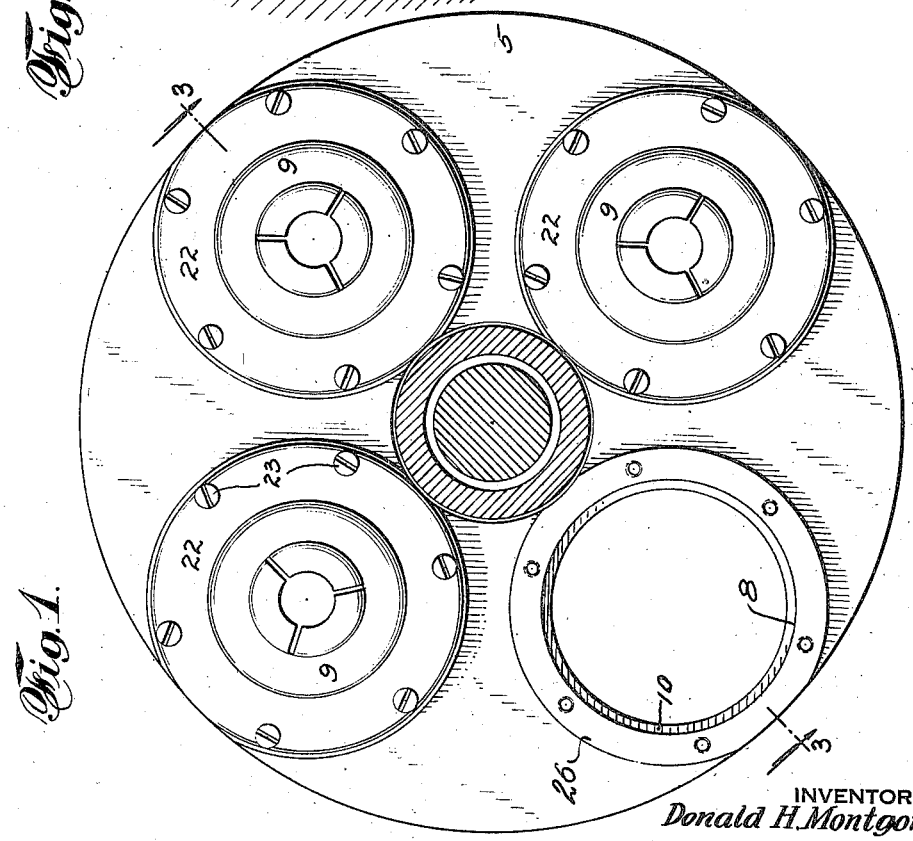
Fig. 1 is a front view of a spindle carrier for a four-spindle screw machine, three of the spindles being shown in place and one being removed.

In said drawings 5 indicates a spindle carrier which may be mounted in a frame 6 for indexing movement, as will be understood. The spindle carrier is provided with a plurality (in this case four) of bores 8 for receiving an equal number of spindles 9. The spindles are mounted on anti-friction bearings which are preloaded, as will be described. In the form shown each bore at the rear has a shoulder 10. The spindle 9 carries spaced apart anti-friction bearings, such as ball bearings. One inner ring 11 is mounted on the spindle 9 and abuts the shoulder 12 on the spindle at the front. The outer ring 13 fits within the bore and the balls 14 space the rings apart. Toward the rear of the spindle is a second anti-friction bearing, such as a ball bearing, the inner ring 15 of which fits the spindle 9 and the outer ring 16 fits within the bore and abuts the shoulder 10 therein. Interposed between the outer rings 13—16 is a spacer sleeve 17 and between the inner rings 11—15 there is a second spacer sleeve 18. The inner spacer 18 is slightly shorter (depending on the preloading desired) than the outer sleeve 17. The spindle may be mounted in its bearing as follows:

The bearings and spacers are assembled on the spindle in the positions heretofore described. In the form shown there is a spacer ring 19 surrounding the spindle and interposed between the inner ring 15 and the drive gear 20 for the spindle. The spindle is threaded to receive a nut 21, which abuts the drive gear 20, and when the nut 21 is screwed up the inner rings 11—15 are drawn toward each other. When the parts are thus assembled and the bearings merely held in place without any preloading the spindle is assembled within the bore and then an end cap 22 may be secured to the face of the spindle carrier, as by means of screws 23. The cover cap serves to force the outer ring 13 rearwardly and serves to hold or assist in holding all of the parts in assembled relation on the spindle carrier. The nut 21 is then turned up to preload the bearings. It will be noted that the bearings are of the angular contact type and, as has been heretofore stated, the inner sleeve 18 is somewhat shorter than the outer spacer sleeve 17. Thus, when the nut 21 is screwed up the inner ring 15 is forced toward the other inner ring 11 and the bearing may be preloaded to the extent permitted by the particular shortness of the spacer sleeve 18.

During the preloading of the bearing the outer rings are actually expanded and in so expanding grip or fit the bore 8 very tightly and, in fact, the wall of the bore is expanded or there is a tendency to expand it. Due to the fact that in the ordinary spindle carrier the wall of the carrier surrounding the bore is of varying thickness or expansibility, with heavily preloaded bearings there is a tendency for the bearing to be expanded out of round, with consequent disastrous effects upon the bearing. I have provided a spindle carrier or other mounting for the rotatable member, such as a spindle, with a wall of substantially uniform thickness surrounding the bore at the zone of one or both of the anti-friction bearings. Such a wall of uniform thickness may be obtained in a number of ways but, in the form shown, the end of the spindle carrier is cored out, as indicated at 25, so as to in effect provide a projecting sleeve or shell 26 surrounding each bore and constituting the outer defining wall. The depth of the core 25 or, in other words, the depth of the shell 26 should be equal to or preferably somewhat greater than the width of the outer ring when that ring is mounted at about the end of the carrier, as illustrated in Fig. 3. With such a surrounding wall of substantially uniform thickness, when the outer ring is expanded due to the preloading heretofore noted, the shell or wall will expand substantially uniformly and the preloaded bearing will remain perfectly round.

While the drawings show the coring out producing the sleeves of uniform thickness only at the front of the spindle carrier, it is to be understood that at the rear substantially the same construction may be employed, so that both bearings will be mounted in projecting shells of substantially uniform thickness so that both bearings will, in expanding, stay in round and not be expanded to an out of round shape. However, in a spindle carrier construction as shown it is the front bearing that takes the tool thrusts and under such loads tends to expand.

While the invention has been described in some detail and as specifically applied to the spindle carrier of a multiple spindle screw machine, it is to be understood that the invention may be otherwise embodied and that various changes and modifications may be made within the scope of the invention as defined in the appended claims.

I claim:

1. A spindle carrier having a bore to receive an anti-friction bearing, an angular contact anti-friction bearing mounted in said bore, said spindle carrier having an integral wall of substantially uniform thickness surrounding said anti-friction bearing, for the purpose described.

2. A spindle carrier having a plurality of bores for receiving anti-friction bearings for rotatable spindles, angular contact type anti-friction bearings mounted in said bores, said spindle carrier having integral walls of substantially uniform thickness surrounding each of said anti-friction bearings, for the purpose described.

3. A spindle carrier having a bore to receive an anti-friction bearing for a rotatable spindle, the body of said spindle carrier being cored out around the bore at the zone of said anti-friction bearing to leave a sustaining wall of substantially uniform thickness for said anti-friction bearing.

4. A spindle carrier having a bore therein, a pair of spaced apart angular contact bearings in said bore, a spindle carried by said bearings, means for preloading said bearings, said spindle carrier having an integral wall of substantially uniform thickness surrounding said bore at the zone adjacent at least one of said anti-friction bearings.

5. A spindle carrier having a plurality of spaced bores therein for spindles, a wall of substantially uniform thickness surrounding each of said bores and projecting from the face of said spindle carrier, an anti-friction bearing in each said bore and held within said walls projecting from the forward face of said spindle carrier, for the purpose described.

DONALD H. MONTGOMERY.